Patented Nov. 1, 1932

1,885,619

UNITED STATES PATENT OFFICE

HENRY H. MORETON, OF SANTA MONICA, CALIFORNIA, ASSIGNOR OF ONE-THIRD TO O. B. ENGLISCH, OF CHICAGO, ILLINOIS, AND ONE-THIRD TO CHARLES F. CRAIG, OF LOS ANGELES, CALIFORNIA

COMPOUND FOR PURIFYING OILS

No Drawing.   Application filed October 8, 1928. Serial No. 311,241.

This invention is a compound for use in purifying and reclaiming oils.

In the art of purifying and reclaiming used or contaminated oils, the only methods which appear to be commercially successful at the present time are those which involve distillation steps similar to those usually practiced in the treatment of crude oil. These methods while more or less successful are open to the objection that expensive apparatus is required for reclaiming the oils, and there is a great loss in the bulk of the reclaimed oil as compared to the volume of contaminated oil treated. Other methods and apparatus have been tried which involve filtering and bleaching operations, but they do not appear to have been commercially successful. One reason is that in the case of used crank case oil, for instance, it has been found impossible to remove the minute carbon particles which are suspended in the oil by filtration. The same is true with respect to the gummy substances or what may be termed the "rosins" which are also suspended in the oil.

In a separate application filed concurrently herewith Serial No. 311,239 is described and claimed a process of precipitating mechanical impurities carried by oils, by the use of plaster of paris or calcium sulphate deposited in the oil, and no claim is made herein for this broad subject matter. As pointed out in the said application the mechanical impurities suspended in oil such as the gummy substances which many times discolor new oil, and the carbon and other impurities which have been taken up by used oil, such as crank case oil and the like are precipitated by bringing the oil into contact with plaster of Paris or similar calcarious substances.

In the art of purifying oils it is also sometimes desirable to subject the oil to the so-called "acid treatment" i. e. to the action of sulphuric acid for the purpose of removing impurities which cannot be reached by any other known method. But in the acid treatment as now commonly practiced in the art there is always danger of using too much acid, with the result that the oil will be discolored to a more or less permanent degree, and to a sufficient extent to impair its commercial value.

One of the objects of the invention is to provide a compound to be introduced into the oil to be treated, whether for the purpose of reclaiming used or contaminated oils, or for purification treatment of other oils, by means of which the oil may be subjected to an acid treatment while the impurities which are to be removed are being precipitated to such an extent that they may be completely removed by filtration and without the necessity of employing expensive and cumbersome distilling apparatus. A further object is to produce a compound of the character described which is exceedingly cheap and by the use of which the purifying process is not only simplified and cheapened, but in addition thereto the loss in bulk during the reclaiming or purifying process is reduced to such an extent as to be practically negligible.

The invention will be hereinafter fully described and particularly pointed out in the claims.

The compound forming the subject matter of the present invention consists of a mixture of calcium sulphate or its equivalent with silica and sulphuric acid. While it is preferred to use calcium sulphate as an ingredient, either in the form of plaster of Paris or gypsum, the invention is not limited to this substance because other calcareous cements may be employed in lieu thereof, such as calcium sulphate, natural cement, Portland cement and the like, and wherever the term gypsum is used in this specification, it is to be understood that the substances above mentioned are to be considered as equivalents thereof and within the spirit of the invention.

The action of the calcium sulphate as an element of the present compound is identical with that described and claimed in the application for patent above referred to. That is when brought into contact with the oil, either by depositing it into the oil or by making it a substantial constituent of an oil filter, the minute particles of carbon, gums and the like, which are suspended in oil, such as used crank-case oil for instance, are brought together in such a manner that they may be readily removed. If the first method is employed the impurities may be afterwards removed by filtration or by allowing them to settle, and then drawing off the oil. If the second method is employed the impurities are attracted as they come in contact with the filter bed, and removed as the oil passes through. The carbon particles are ordinarily too fine to be removed by filtration, and the effect of the calcium sulphate is to cause these particles to assume a form and condition by which mechanical separation thereof from the oil may be easily accomplished.

Experience has demonstrated that the introduction of sulphuric acid into the oil simultaneously with the calcium sulphate, and in the absence of any modifying or controlling agencies, tends to destroy the action of the calcium sulphate, because said last mentioned material as soon as it comes into contact with the acid will cake or harden, or both, and its precipitating efficiency is destroyed. In a copending application Serial No. 311,240 filed concurrently herewith, however, is described and claimed a compound for effectively accomplishing the acid treatment of oils. Said compound consists of a mixture of sulphuric acid and silica. It has been discovered that by mixing this compound with the calcium sulphate, the acid treatment of the oil may be effectively carried out, without in any manner impairing or destroying the precipitating properties of the calcium sulphate. It is to be understood, however, that no claim is made herein to the broad mixture consisting of sulphuric acid and silica, because such claims are included in the application above identified, but that the present case is limited to the combination of said acid treatment with calcium sulphate.

Experience has demonstrated that excellent results are obtained by the following mixture:—

| | |
|---|---|
| Sulphuric acid | 1 gallon. |
| Silica | 100 pounds. |
| Calcium sulphate | 100 pounds. |

The substances are compounded by first mixing the sulphuric acid and the silica in a suitable receptacle and in any desired manner. For instance by pouring the acid over the silica and stirring until they are thoroughly intermixed, so that the normally insoluble particles of silica are thereby coated with the acid. The calcium sulphate may then be combined with the acid compound by any suitable method of mechanical mixing. As pointed out in the application for patent above identified, the silica is in the form of powdered quartz or high grade sand between 400 and 200 mesh, preferably at 300 mesh.

In practice, the compound is brought into contact with the oil to be treated, either by depositing it into the oil and allowing it to stand, or by incorporating the compound into a filter bed so as to form a component part thereof. If the precipitation method is employed, the treated oil is allowed to stand until the impurities settle, and the oil drawn off, or the oil may be filtered in any desired or known manner. The time element may be reduced by incorporating the mixture in a filter bed so that the separation may take place as soon as the impurities are attracted by the calcium sulphate.

In addition to the purifying action above described, the mixture if allowed to stand two weeks or more after compounding and before being introduced into the oil, will not only perform the impurity-separating functions above described, but it will also bleach the oil even to the extent of removing the dyes which may be incorporated therein.

The advantages of the invention will be readily understood by those skilled in the art of purifying and reclaiming oils. An important advantage is that the purification of the oil, by removing mechanical impurities such as carbon and gummy substances, may be accomplished simultaneously with an acid treatment of the oil. With the ingredients compounded in the manner above described the calcium sulphate will not cake or harden, probably because the silica crystals become coated with the acid and the distribution of the acid is such that the objectionable reaction of the acid upon the calcium sulphate is prevented. Apparently the silica acts as an acid carrier to distribute the acid uniformly throughout the oil so that there is insufficient concentration at any point to burn the oil. The absorbent characteristics of the calcium sulphate apparently are such that they have the effect of collecting and depositing the carbon and gummy impurities, so that they may be readily separated. The anhydrous nature of calcium sulphate may possibly be a factor in the action produced thereby. It is to be understood, however, that the above stated theories are more or less conjectural and are not intended to be binding or limiting, the significant fact being that the calcium sulphate does so act upon the mechanically suspended impurities that they may be readily separated from the oil, and the acid introduced into the oil by the method described does not burn or discolor the oil.

Having thus explained the nature of the invention and described an operative manner of constructing and using the same, although without attempting to set forth all of the forms in which it may be made, or all of the forms of its use, what is claimed is:—

1. A compound for purifying oils consisting of a mixture of one gallon of sulphuric acid, 100 pounds of powdered silica, and 100 pounds of calcium sulphate.

2. A compound for purifying oils consisting of a mixture of one hundred pounds of quartz powder of approximately 300 mesh, 1 gallon of sulphuric acid, and 100 pounds of calcium sulphate.

3. The method of producing a compound for purifying oils comprising mixing sulphuric acid, powdered silica, and calcium sulphate, and allowing the mixture to stand a substantial period of time before using.

4. The method of producing a compound for purifying oils comprising mixing sulphuric acid and powdered silica, then mixing calcium sulphate therewith, and then allowing the complete mixture to stand approximately two weeks before using.

5. A compound for purifying oils consisting of a substantial quantity of calcium sulphate mixed with quartz particles coated with sulphuric acid.

6. A compound for purifying oils consisting of calcium sulphate mixed with an approximately equal quantity by weight of finely powdered silica particles coated with sulphuric acid.

7. A compound for purifying oils comprising a mechanical mixture of a substantial quantity of calcium sulphate with a mixture of a substantial quantity of finely divided quartz particles and sulphuric acid.

In testimony whereof I have hereunto set my hand.

HENRY H. MORETON.